United States Patent [19]

Bordeianu et al.

[11] Patent Number: 5,502,125
[45] Date of Patent: Mar. 26, 1996

[54] PROCESS FOR PREPARING ETHYLENE COPOLYMERS

[75] Inventors: Radu Bordeianu, Marl; Christoph Theis, Niederkassel, both of Germany

[73] Assignee: Huels Aktiengesellschaft, Marl, Germany

[21] Appl. No.: 401,975

[22] Filed: Mar. 10, 1995

[30] Foreign Application Priority Data

May 5, 1994 [DE] Germany ............ 44 15 872.6

[51] Int. Cl.⁶ .................. C08F 210/18; C08F 4/685
[52] U.S. Cl. .................. 526/140; 502/127; 526/141; 526/143; 526/282
[58] Field of Search .................. 526/140, 141, 526/143

[56] References Cited

U.S. PATENT DOCUMENTS

| | | | |
|---|---|---|---|
| 3,629,212 | 12/1971 | Benedikter et al. | 526/143 |
| 3,723,348 | 3/1973 | Apotheker et al. | 526/143 |
| 5,118,773 | 6/1992 | Takao et al. | 526/143 |

FOREIGN PATENT DOCUMENTS

| | | |
|---|---|---|
| 1272847 | 8/1990 | Canada. |
| 0024485 | 3/1981 | European Pat. Off.. |
| 0044119 | 1/1982 | European Pat. Off.. |

*Primary Examiner*—Edward J. Smith
*Attorney, Agent, or Firm*—Oblon, Spivak, McClelland, Maier & Neustadt

[57] ABSTRACT

An olefin copolymer is prepared by copolymerizing ethylene, an α-olefin and, optionally a diene having non-conjugated double bonds by solution polymerization in the presence of:

(a) an organoaluminum compound,
(b) a vanadium compound in the oxidation state from +3 to +5, and
(c) an activator in a molar ratio of from 0.5 to 100 relative to vanadium of said vanadium compound, and an activator of a 2-halomalonic ester substituted by an aromatic group and having the formula

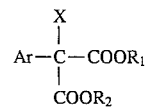

wherein X=F, Cl, Br or I, Ar is an aromatic radical which is unsubstituted, monosubstituted or polysubstituted by alkyl or alkoxy groups and which is bound to the central carbon atom either directly or by an intervening carbonyl group; and $R_1$ and $R_2$ are hydrocarbon radicals having from 1 to 20 carbon atoms.

7 Claims, No Drawings

PROCESS FOR PREPARING ETHYLENE COPOLYMERS

BACKGROUND OF THE INVENTION

1. Field of the Invention

The invention provides a process for preparing low-chlorine content ethylene copolymers by solution polymerization using vanadium-containing mixed catalysts and in particular low-chlorine activators.

2. Description of the Background

It is known that ethylene can be polymerized together with other α-olefins and, if desired, non-conjugated dienes in the presence of organometallic (Ziegler-Natta) mixed catalysts. The polymerization is carried out in organic solvents. The catalysts used are transition metal compounds of the subgroups IV to VI of the Periodic Table (usually vanadium compounds in the oxidation states 3+ to 5+) together with organometallic compounds of the main groups I to III (usually organoaluminum compounds). Such catalyst systems have a very high initial activity which, however, rapidly decreases as a result of the rapid reduction of the vanadium to low, polymerization-inactive oxidation states (e.g. 2+). To achieve industrially acceptable polymer yields, use is made of activators which reoxidize the vanadium to polymerization-active oxidation states.

The most efficient activators for the vanadium-containing catalysts are chlorine-containing substances. In practice, polychlorinated compounds such as, for example, trichloroacetic esters (DE-A 15 70 726, Hercules Powder Co.), perchlorocrotonic esters (DE-B 15 95 442, Hüls AG) or hexachlorocyclopentadiene (DE-A 14 95 698, Farbwerke Hoechst AG) have proven useful. However, these activators have the decisive disadvantage that the resulting copolymers have a chlorine content which is too high. Some polymer properties, primarily the ageing resistance, are impaired by the chlorine content. Furthermore, chlorine-containing polymers lead to increased corrosion during processing of the chlorine containing polymer. Lower chlorine content compounds, e.g. monochloromalonic and dichloromalonic esters (CA 1 272 847, Uniroyal Chemical Co.) usually have a low activity. In practice this use of such compounds leads to a low solids content in the polymer solution. To overcome this deficiency, disproportionately high ratios of activator/$VOCl_3$ would be needed, which is very disadvantageous economically.

In recent years, effective compounds having lower chlorine contents have been claimed as activators, e.g. dichlorophenylacetic esters (EP-B-0 044 119 and 0 044 595, Stamicarbon B. V.). However, even when such activators are employed, the chlorine concentration in the polymer can be reduced to the low level required only by expensive polymer washing. A need, therefore, continues to exist for a catalyst activator which leads to lower chlorine content in the product polymer.

SUMMARY OF THE INVENTION

Accordingly, one object of the present invention is to provide a chlorine containing activator for ethylene polymerization which leads to a polymer product containing reduced concentration levels of chlorine.

Another object of the invention is to provide an effective activator for a Ziegler-Natta olefin polymerization catalyst.

Briefly, these objects and other objects of the present invention as hereinafter will become more readily apparent can be attained by an activator for a V/Al olefin polymerization catalyst which is a 2-halomalonic ester having the formula:

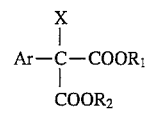

wherein X=F, Cl, Br or I, Ar is an aromatic radical which can be unsubstituted, monosubstituted or polysubstituted by alkyl or alkoxy groups and which can be bound to the central carbon atom either directly or by an intervening carbonyl group, and $R_1$ and $R_2$ are hydrocarbon radicals having from 1 to 20 carbon atoms.

DETAILED DESCRIPTION OF THE PREFERRED EMBODIMENTS

In the 2-halomalonic ester compound described above, preferred Ar radicals include phenyl, pyridyl, thienyl and the like. Radicals $R_1$ and $R_2$ are $C_{1-20}$ hydrocarbon radicals which include alkyl, aryl, aralkyl, cycloalkyl and the like. Preferred monohalogenated 2-halomalonic esters include 2-chloro- and 2-bromo-2-phenylmalonic esters, e.g. diethyl 2-chloro-2-phenylmalonate. The activator/vanadium molar ratio should be from 0.5 to 100, preferably 1 to 20.

The activator of the present invention makes it possible to achieve solids contents which give a good throughput and thus contribute to the good economics of the process of the invention.

The α-olefin reactant of the present process contains from 3 to 10 carbon atoms. Propene is preferred as the α-olefin. The ethene content in the copolymer is between 25 and 85% by weight, for rubber-like copolymers it is preferably between 40 and 75% by weight.

For copolymer vulcanization, unsaturated side chains are necessary in most crosslinking systems. For this purpose, a preferably non-conjugated diene, e.g. 5-ethylidene-2-norbornene, dicyclopentadiene or 1,5-hexadiene, is used as a third monomer. The concentration of the third monomer in the copolymer is from 1 to 15% by weight, preferably from 1 to 10% by weight.

Vanadium components which can be used in the catalyst system are halides, oxyhalides, acetylacetonates or alkoxides, e.g. $VCl_3$, $VCl_4$, $VOCl_3$, vanadium trisacetylacetonate, vanadyl bisacetylacetonate, alkyl vanadates having from 1 to 20 carbon atoms, etc.

Organoaluminum components which can be used in the catalyst system include, for example, ethylaluminum sesquichloride, ethylaluminum dichloride, diethylaluminum chloride, diisobutylaluminum chloride and mixtures of these compounds. The Al/V molar ratio ranges from 1 to 1000, preferably from 2 to 50.

In order to regulate the molecular weight of the polymer, use is made, if desired, of chain transfer agents which include hydrogen, ammonia, amines, dialkylzinc, alkyl halides, acetylene hydrocarbons, etc. in the amount necessary to achieve the desired molecular weight.

The polymerization reaction is carried out in an inert solvent including alkanes such as butane, pentane, hexane, $C_6$ fractions, heptane, and the like and arenes such as benzene, toluene, and the like and even liquid α-olefins, at temperatures ranging from 0° to 100° C., preferably from 20° to 80° C.

Having generally described this invention, a further understanding can be obtained by reference to certain specific examples which are provided herein for purposes of illustration only and are not intended to be limiting unless otherwise specified.

EXAMPLE 1

Polymerization was carried out by known methods as described in DE-A 15 95 442 (Hüls AG), U.S. Pat. No. 3,622,548 herein incorporated by reference. An EPDM having an ethylene content of about 50% and an ethylidenenorbornene (ENB) content of about 8% was prepared. The propene content was accordingly about 42%. The catalyst system used was ethylaluminum sesquichloride (EASC) and $VOCl_3$, and n-butylamine was used as a molecular weight regulator.

The activator diethyl 2-chloro-2-phenylmalonate was used in a molar ratio of 8:1 to the $VOCl_3$.

The reaction was carried out at an internal temperature of 50° C. and a pressure of 5.5 bar.

A mean solids content of 6.8% by weight was achieved. The polymer solution was subsequently stopped by the addition of distilled water with vigorous stirring and stabilized with 0.8% of a phenolic antioxidant. The polymer was then precipitated with warm water and steam in a continuous plant, with the solvent being used as azeotrope. The mean residence time of the polymer crumbs in the solvent removal apparatus was about 1 h.

Chemical analysis of the polymer gave the following results: propene: 42%, ethene: 49.8%, ENB: 8.2%, chlorine content: 385 ppm.

Comparative Example A

Under otherwise identical polymerization conditions as described in Example 1, ethyl dichlorophenylacetate (EDCPA) was used as activator. The amount of activator added was set in such a way that the solids content of the polymer solution was the same as described in Example 1. The EDCPA/$VOCl_3$ molar ratio was 5.6.

Chemical analysis of the polymer treated as described in Example 1 gave a chlorine content of 850 ppm.

Comparative Example B

Under the same polymerization conditions as described in the other examples, butyl perchlorovinyl acetate was used an activator. To achieve the same solids content, a molar ratio of activator/$VOCl_3$=4.9 was necessary.

Polymer analysis showed a chlorine content of 1800 ppm.

Having now fully described the invention, it will be apparent to one of ordinary skill in the art that many changes and modifications can be made thereto without departing from the spirit or scope of the invention as set forth herein.

What is claimed and desired to be secured by letters patent of the United States is:

1. A process for preparing olefin copolymers, comprising:
   copolymerizing ethylene, an α-olefin and, optionally a diene having non-conjugated double bonds by solution polymerization in the presence of:
   (a) an organoaluminum compound,
   (b) a vanadium compound in the oxidation state from +3 to +5, and
   (c) an activator in a molar ratio of from 0.5 to 100 relative to vanadium of said vanadium compound, said activator being a 2-halomalonic ester substituted by an aromatic group and having the formula

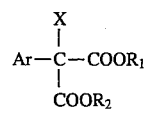

wherein X=F, Cl, Br or I, Ar is an aromatic radical which is unsubstituted, monosubstituted or polysubstituted by alkyl or alkoxy groups and which is bound to the central carbon atom either directly or by an intervening carbonyl group; and $R_1$ and $R_2$ are hydrocarbon radicals having from 1 to 20 carbon atoms.

2. The process of claim 1, wherein said Ar radical is phenyl, pyridyl or thienyl.

3. The process of claim 1, wherein said $R_1$ and $R_2$ radicals are selected from the group consisting of alkyl, aryl, aralkyl and cycloalkyl.

4. The process of claim 1, wherein the aromatically substituted 2-halomalonic ester is an alkyl ester of 2-halo-2-phenylmalonic acid.

5. The process of claim 4 wherein the aromatically substituted 2-halamalonic ester is an alkyl ester of 2-chloro-2-phenyl malonic acid, where $R_1$ and $R_2$ are simultaneously or independently methyl, ethyl, propyl, butyl or pentyl groups.

6. The process of claim 1, wherein the organoaluminum compound (a) is ethylaluminum sequichloride, diethylaluminum chloride, ethylaluminum dichloride, diisobutylaluminum chloride, isobutylaluminum dichloride, isobutylaluminum sesquichloride or trihexylaluminum.

7. The process of claim 1, wherein the vanadium compound (b) is vanadium oxytrichloride, vanadium tetrachloride, vanadium acetylacetonate, vanadium naphthenate, triethoxyvanadate, diethoxymonochlorovanadate, ethoxydichlorovanadate, tributoxyvanadate, dibutoxymonochlorovanadate or butoxydichlorovanadate.

\* \* \* \* \*